United States Patent
Lyons et al.

(10) Patent No.: US 9,680,894 B2
(45) Date of Patent: Jun. 13, 2017

(54) MULTIPLE VIRTUAL MACHINE MEMORY USAGE REDUCTION SYSTEM AND METHOD

(71) Applicant: Bally Gaming, Inc., Las Vegas, NV (US)

(72) Inventors: Martin S. Lyons, Henderson, NV (US); Joseph Lerner, Reno, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 607 days.

(21) Appl. No.: 14/185,822

(22) Filed: Feb. 20, 2014

(65) Prior Publication Data

US 2014/0172964 A1   Jun. 19, 2014

Related U.S. Application Data

(63) Continuation-in-part of application No. 13/273,611, filed on Oct. 14, 2011, now abandoned.

(51) Int. Cl.

| | |
|---|---|
| *G06F 15/16* | (2006.01) |
| *H04L 29/06* | (2006.01) |
| *A63F 13/30* | (2014.01) |
| *G06T 1/60* | (2006.01) |
| *G09G 5/36* | (2006.01) |
| *G09G 5/39* | (2006.01) |
| *G06F 9/455* | (2006.01) |
| *G06F 3/14* | (2006.01) |

(52) U.S. Cl.
CPC .............. *H04L 65/60* (2013.01); *A63F 13/12* (2013.01); *G06F 9/45533* (2013.01); *G06T 1/60* (2013.01); *G09G 5/36* (2013.01); *G09G 5/39* (2013.01); *A63F 2300/538* (2013.01); *G06F 3/1454* (2013.01); *G09G 2340/02* (2013.01); *G09G 2370/022* (2013.01)

(58) Field of Classification Search
CPC ........................................................ H04L 65/60
USPC .......................................................... 709/231
See application file for complete search history.

(56) References Cited

U.S. PATENT DOCUMENTS 8,805,951 B1 *  8/2014  Faibish ................. G06F 9/5072
                                                                 709/213
8,990,946 B1 *  3/2015  Yarykin .............. H04L 63/0272
                                                                 713/188

(Continued)

*Primary Examiner* — Vivek Srivastava
*Assistant Examiner* — Atta Khan
(74) *Attorney, Agent, or Firm* — Seed IP Law Group LLP

(57) ABSTRACT

A system is described herein for streaming content to a plurality of client devices of the type including a video display. The system includes: a host server, a communication network to enable communication between the virtual machines and the client devices, and a data structure accessible by the host server storing a combined manifest for AV data assets loaded across at least a plurality of virtual machines. The host server is configured to include a plurality of virtual machines each configured to receive commands to load or cache audio-visual (AV) data assets into a memory for processing and delivery of content to a client device. Additionally, the host server is configured to intercept a command from a virtual machine to load or cache a data asset, compare the data asset to the manifest, and if the data asset exists in the manifest, enable the virtual machine to access an instance of the data asset stored in the manifest.

17 Claims, 11 Drawing Sheets

(56) References Cited

U.S. PATENT DOCUMENTS

| | | | | |
|---|---|---|---|---|
| 2002/0107934 A1* | 8/2002 | Lowery | ............... | G06F 17/3087 709/213 |
| 2006/0064545 A1* | 3/2006 | Wintergerst | .......... | G06F 12/084 711/130 |
| 2008/0242421 A1* | 10/2008 | Geisner | ................... | A63F 13/75 463/42 |
| 2011/0246518 A1* | 10/2011 | Mehrotra | ............ | H04L 67/2842 707/770 |
| 2011/0265083 A1* | 10/2011 | Davis | ................. | G06F 12/0866 718/1 |
| 2012/0151044 A1* | 6/2012 | Luna | ....................... | H04W 4/18 709/224 |
| 2012/0284356 A1* | 11/2012 | Luna | ................ | G06F 17/30902 709/213 |
| 2012/0295693 A1 | 11/2012 | Bytnar et al. | | |
| 2014/0052892 A1* | 2/2014 | Klein | ................. | G06F 12/0246 711/103 |

* cited by examiner

| Filename | DSA signature |
|---|---|
| Backdrop.png | 9b77f705 4c81531c 4e46a469 2fbfe0f7 7f7ebff2 |
| Wintune1.wav | 95b4f608 1f8f890e 4b5a199e f10ffe21 f52b2d68 |

MULTIPLE VIRTUAL MACHINE MEMORY USAGE REDUCTION SYSTEM AND METHOD

CROSS-REFERENCE TO RELATED APPLICATIONS

This application is a Continuation in Part of U.S. patent application Ser. No. 13/273,611, entitled "Graphics Processing Unit Memory Usage Reduction," filed on Oct. 14, 2011, which is incorporated herein by reference in its entirety. U.S. patent application Ser. No. 13/273,611 is related to co-pending U.S. patent application Ser. No. 13/273,555, entitled "Streaming Bitrate Control And Management," filed on Oct. 14, 2011, which is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates to reducing the memory footprint of audio-visual resources on memory using virtual machines.

BACKGROUND

A virtual machine (VM) is a method of abstracting or emulating real computing resources such as memory, CPU cycles, and network interfaces. This abstraction allows multiple virtual machines to co-exist on one physical server, each sharing the resources available. Importantly, software running in a VM generally does not have any awareness of the other VMs. The VM host provides a complete OS environment to each VM client.

Virtual machines have become very popular in IT departments. They allow the commissioning and de-commissioning of servers as needed without the purchase or disposal of hardware. VMs also allow resources to be utilized more efficiently. A server hosted in a VM that is idle for most of the time does not require a dedicated CPU or memory that is hardly used. VMs also make deployment predictable because individual virtual servers do not interact, which is not the case if servers share a common OS installation. So if a patch is required for an email server, the email server can be taken offline without affecting a web server that may, for cost reasons, share the same server hardware.

Historically, gaming machine software has either been monolithic or thick-client. In a monolithic implementation a gaming machine contains a dedicated CPU, memory and associated peripherals. The gaming machine software may implement multi-game, or have the capability to receive system updates of new games but at any one time only one software instance runs on a dedicated CPU. A thick-client implementation has the same characteristics except that certain functions such as random number generation are handled by a server common to many machines.

While the use of virtual machines does provide many benefits, virtual machines are also associated with several disadvantages. The significant disadvantage of VMs is the extra overhead they require to operate. Some of this overhead is CPU usage. For example, if two VMs share one physical CPU then there is a cost in switching contexts between the two. With modern VM-aware CPUs this overhead is relatively small and acceptable. However, another disadvantage is the bigger overhead associated with the memory footprint requirements of VMs. As noted above, each VM instance has its own OS installation and does not share resources with other co-hosted instances.

Continuing, current systems that render graphics generally use a central processing unit (CPU) having a corresponding system memory, and a graphics processing unit (GPU) having a corresponding video memory. The CPU sends instructions to the GPU to draw visual elements for rendering into a frame buffer in the video memory. The instructions typically comprise commands to draw graphical primitives such as shapes, polygons, textures, coordinates, and other metadata. Graphical primitives that are frequently used or of a particular size are often cached in the video memory to avoid saturating the data bus between the CPU and GPU. Even though the video memory generally reserves a region for one or more frame buffers, most of the memory is usually reserved for and consumed by textures. Textures are generally used to add detail to an underlying graphical primitive such as a line, polygon, or surface by using a process known as texture mapping. Otherwise stated, textures give the illusion of geometric complexity.

Textures vary from application to application. For example, in a casino gaming environment, a texture may include a reel symbol, button icon, or logo on an electronic gaming machine (EGM) that presents a slot machine style game. In an application involving an EGM that presents a Blackjack game, a different texture may correspond to the chip icons and the individual rank and suit of each playing card. For example, a rectangle may be mapped with an Ace of Spades texture or a King of Hearts texture. Another example highlights the importance of texture mapping. A game may depict a brick wall. Without texture mapping, the brick wall may be presented by a multitude of offset and adjacent rectangles. However, the geometric complexity may be reduced by mapping a texture, such as a bitmap derived from an image, or even an animation, of a brick wall, over a single large rectangle.

Textures may generally be categorized as static or dynamic. Static textures are derived from graphical data such as images or animations whereas dynamic textures are derived from graphical data such as a streamed animation, i.e., an animation that is accessed as a stream (frame by frame). The graphical data corresponding to both static and dynamic textures may be stored in system memory in a lossy or lossless compressed state. During a pre-load boot process, the CPU or GPU usually decompresses the compressed graphical data corresponding to static textures and stores the uncompressed textures in the video memory associated with the GPU. For example, a compressed image (i.e., non-animated graphic) may be decompressed and stored as a single texture in video memory. Similarly, each frame corresponding to an animation may be decompressed and stored as an individual texture in video memory. With respect to dynamic textures, the CPU or GPU usually decompresses the compressed graphical data as each frame is needed for rendering rather than pre-load the video memory with all frames during the pre-load boot process as is done for static textures. For example, the first frame of a streamed animation may be decompressed, stored in video memory, rendered, and then discarded prior to decompression of the next frame in the streamed animation.

The use of textures has resulted in video memory being fully utilized (or very close to being fully utilized) by designers. Accordingly, though the storage of textures on the video memory reduces the amount of data transferred from the CPU to the GPU, such memory consumption affects the number of games or instances of software that may be run in a virtualized environment. Thus, the advent of virtualization has generated a need to reduce the consumption of memory associated with the GPU. More specifically, virtualization enables multiple games or other software to be run on a single server employing a CPU and GPU provided that there are enough system resources (e.g., video memory) for each game or software instance. Thus, there is a need to provide more memory considering a single game is often designed to fully utilize video memory. One solution comprises introducing more hardware; however, this adds cost and may only be possible with custom hardware depending on the amount of memory sought to be added. Accordingly, there continues to be a need for improvements in the area of virtualization; and more particularly, the memory associated with a virtualized environment.

SUMMARY

Briefly, and in general terms, various embodiments are directed to a system and method for reducing the memory footprint of an application on video memory.

In some embodiments, a system is configured to stream content to a plurality of client devices of the type including a video display. The system includes: a host server, a communication network to enable communication between the virtual machines and the client devices, and a data structure accessible by the host server storing a combined manifest for AV data assets loaded across at least a plurality of virtual machines. The host server is configured to include a plurality of virtual machines each configured to receive commands to load or cache audio-visual (AV) data assets into a memory for processing and delivery of content to a client device. Additionally, the host server is configured to intercept a command from a virtual machine to load or cache a data asset, compare the data asset to the manifest, and if the data asset exists in the manifest enable the virtual machine to access an instance of the data asset stored in the manifest.

In another embodiment, a host server is configured to host a plurality of virtual machines each configured to process commands to deliver displayable content to a plurality of client devices over a network. The host server includes: a data structure storing for at least a plurality of virtual machines content asset data; a content asset data manifest; and a processor configured to process and deliver content to a client device over a communication network to enable communication between the virtual machines and the client devices. Additionally, the host server is configured to intercept from the virtual machines commands to load or cache data assets, to compare the data asset subject to the commands to the data stored in the data structure and where the data asset is subject to the commands exists in the data structure to load or cache the data asset from the data structure.

In another embodiment, a method is disclosed for reducing the memory used to host a plurality of virtual machines that are each configured to process data, stream content, and receive input from a player for the play a game at a remote client device over a communication network. The method includes: configuring the host server to have access to a memory structure storing content data assets for use by all virtual machines and a manifest representing a cryptographic tag for the data asset; intercepting a command from a virtual machine to load or cache of required data assets, using the host server; comparing the cryptographic tag for the required data assets to a cryptographic tag in the manifest, using the host server; and enabling a virtual machine to access an instance of the data asset from the memory structure, when the cryptographic tag compares to a tag in the manifest.

The foregoing summary does not encompass the claimed invention in its entirety, nor are the embodiments intended to be limiting. Rather, the embodiments are provided as mere examples.

DETAILED DESCRIPTION

Figure 1:
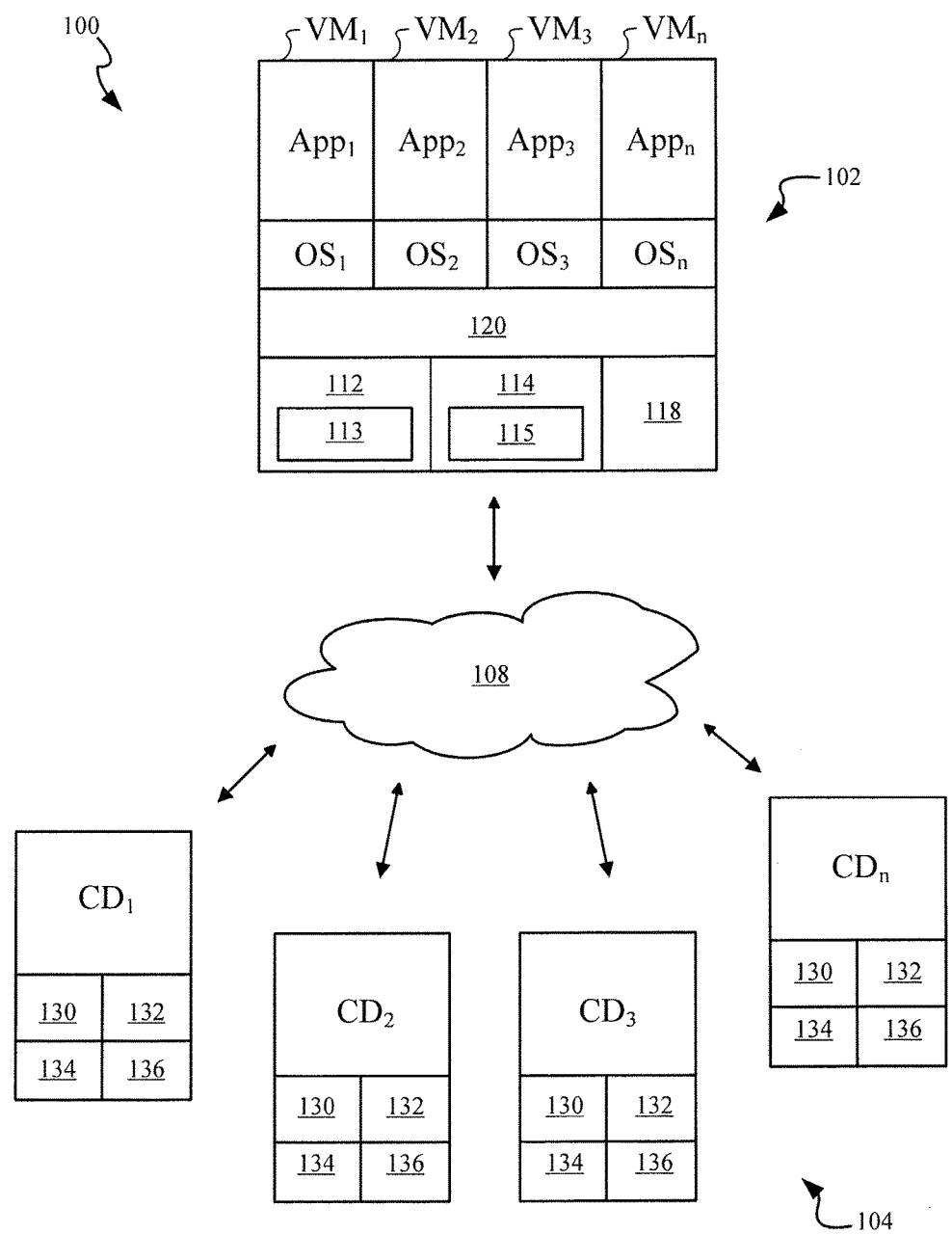
FIG. 1 displays a block diagram illustrating an embodiment of a memory usage reduction system in a virtualized environment.

Referring now to the drawings, wherein like reference numerals denote like or corresponding parts throughout the drawings and, more particularly to FIGS. 1-12, there are shown various embodiments of systems and methods for optimizing GPU memory usage.

More specifically, FIG. 1 illustrates an embodiment of a GPU memory usage reduction system 100 in a virtualized environment. The GPU memory usage reduction system 100 includes a server 102 in communication with one or more client devices 104 over a communication network 108 that may be wired or wireless. The server 102 is the host machine and the one or more client devices 104 are guest machines in the virtualized environment. The client devices 104 are further depicted as $CD_1$, $CD_2$, $CD_3$, and $CD_n$ in FIG. 1, with $CD_n$ representing the nth client device.

In the embodiment shown, the server 102 includes system hardware 110 having a CPU 112, a system memory 113 associated with the CPU, a GPU 114 (e.g., Nvidia Quadro 5800), a video memory 115 associated with the GPU, and a network interface 118. The server 102 also includes virtualization software 120, which is generally referred to as a virtualized machine manager or hypervisor that may be run by the CPU 112. The virtualization software 120 enables the CPU 112 of the host machine to concurrently run a plurality of virtual machines. In some embodiments, proper scheduling techniques may be implemented at the hypervisor level to obtain some degree of temporal isolation or performance isolation.

Thus, as shown in FIG. 1, the virtualization software 120 enables one or more virtual machines to run off the CPU 112. These one or more virtual machines are depicted as $VM_1$, $VM_2$, $VM_3$, and $VM_n$; wherein $VM_n$ represents the nth virtual machine. Each of the one or more virtual machines has a respective virtual operating system $OS_1$, $OS_2$, $OS_3$, and $OS_n$; wherein $OS_n$ represents the nth operating system. The operating systems may be the same or different. For example, $OS_1$ and $OS_2$ may be a version of the Windows operating system and $OS_3$ may be a version of Linux. Each virtual operating system may run one or more applications depicted as $App_1$ for $OS_1$, $App_2$ for $OS_2$, etc. Otherwise stated, $App_1$ may comprise one or more applications just as $App_2$ may also comprise one or more applications. Though numbered differently, $App_1$ through $App_n$ may comprise the same or a different application, or set of applications, if more than one.

The one or more client devices $CD_1$, $CD_2$, $CD_3$, and $CD_n$ respectively correspond to $VM_1$, $VM_2$, $VM_3$, and $VM_n$. As shown, the one or more client devices may each comprise a network interface 130, a video encoder 132, a display 134, and one or more user input devices 136. However, in some embodiments, the one or more client devices may comprise different or additional hardware. For example, $CD_1$ may not have any user input devices whereas $CD_2$, $CD_3$, and $CD_n$ have one or more user input devices and two or three displays. The one or more user input devices 136 may be mechanical, electromechanical, or electrical. For example, the one or more user input devices 136 may comprise touch sensing technology using resistive, infrared, optical, acoustic, mechanical, or capacitive technologies; switches; buttons; a computer mouse; a keyboard; and other input means adaptable to convey a message from a user of the corresponding client device to, e.g., the server 102. The one or more client devices may also generate data based on inputs irrespective of the user. For example, the one or more client devices may have at least one transducer or the like to send data relating to lighting, sound, or temperature conditions around the client device. As another example, the one or more client devices could further include an ultrasonic sensor to monitor movement around the client device.

In one embodiment, $App_1$ through $App_n$ may include an application calling for the generation of graphical data for presentment on the display 134, respectively corresponding to $CD_1$ through $CD_n$. For example, the application may be a game application or a 3-D rendering application that is respectively run on $OS_1$ through $OS_n$. In such an example, the respective client devices may be electronic gaming machines, personal computers, mobile devices, or other electronic devices that call for user involvement such as an eReader (e.g., Amazon KINDLE or Barnes & Noble NOOK). The game application may be of any type, such as card games; dice games; random number games such as Bingo, Keno, and Roulette; slot machine style games; and any other game requiring user involvement. In yet other embodiments, the game application may also include games designed for use with eReaders that promote reading and socializing. For example, points may correspond to a particular book, magazine, or story. Upon being read or purchased, the user may be rewarded with these points that may accumulate, which may be redeemed, or otherwise cashed in. Such redemption may reward the user with some indicia (e.g., a medal for reading 10 best sellers) or trigger some other event such as a game of skill or chance. In one embodiment, $App_1$ is a card game application, $App_2$ is a slot machine style game application, $App_3$ is a slot machine style game application, $App_4$ is a Roulette game application, and $App_5$ is a 3-D rendering application. In such an embodiment, $CD_1$ through $CD_4$ may be an electronic gaming machine and $CD_5$ may be a personal computer.

Due to games generally being designed to fully utilize the video memory 115, it is desirable to reduce the memory footprint associated with games or software (e.g., game applications and 3-D rendering applications). More specifically, this memory usage reduction enables a single server to host a plurality of games or other software in a virtualized environment because the video memory 115 may be cached with graphical data corresponding to one or more applications.

In one embodiment, the system memory 113 stores graphical data, such as textures, corresponding to one or more applications (depicted as $App_1$ through $App_n$) in a lossless compressed state. During a pre-load boot process for an application, the graphical data stored in the system memory 113 corresponding to the application may be decompressed. The decompressed graphical data may then be compressed according to a lossy compression algorithm, such as S3TC. In some embodiments, the CPU 112 compresses the graphical data. In other embodiments, the GPU compresses the graphical data. In yet other embodiments, a separate compression module compresses the graphical data. The compressed graphical data is then stored on the video memory 115. During execution of the one more applications (e.g., playing a game), frames are rendered using the compressed graphical data. More specifically, the compressed graphical data may be decompressed in real-time, in some embodiments, by the GPU prior to rendering the frame calling for the graphical data.

Storing compressed graphical data in the video memory 115 results in a memory footprint reduction ratio at least equal to the compression ratio. For example, a game that would otherwise fully utilize the video memory 115 may be compressed according to a lossy compression algorithm having a compression ratio of approximately 3:1. In such an embodiment, the memory footprint reduction ratio is approximately 3:1. Otherwise stated, storing graphical data compressed according to an algorithm providing a compression ratio of 3:1 reduces the memory consumed by two-thirds. The two-thirds of available memory may then be used for additional applications. For example, the video memory 115 may store graphical data corresponding to three instances of the same game in the example provided. Thus, in a virtualized environment, such as the GPU memory usage reduction system 100, three virtualized machines $VM_1$, $VM_2$, and $VM_3$ may each respectively run the same game application off of the CPU 112 for client devices $CD_1$, $CD_2$, and $CD_3$ due to the memory footprint associated with each game application being reduced. Thus, in an embodiment where a game application is compressed according to an algorithm providing for a 2:1, 4:1, 8:1, 16:1, or 35:1 compression ratio, the GPU memory usage reduction system 100 may concurrently run 2, 4, 8, 16, or 35 instances of the same game application in a virtualized environment on different virtualized machines, respectively.

As previously indicated, the GPU memory usage reduction system 100 may concurrently run different applications as well. For example, the video memory 115 may have 1000 memory units. A first game application may cache 980 memory units worth of graphical data in an uncompressed state in video memory. However, if that graphical data is compressed according to a 4:1 compression ratio, the first game application may only consume about 245 memory units. In such an embodiment, memory space is saved, and therefore may be reallocated, even if less than all 980 memory units are compressed. For example, 400 out of the 980 memory units may be compressed according to a 4:1 compression ratio. Thus, rather than consume 980 memory units, the application may only consume about 580 memory units after compression.

As yet another example, a second game application may consume 2600 memory units when the corresponding graphical data is stored in an uncompressed state. However, if the graphical data corresponding to the second game application is compressed according to a 4:1 compression ratio, the second game application may only consume about 650 memory units. Thus, in some embodiments, storing compressed graphical data enables the CPU 112 to run more than one game application in a virtualized environment. In other embodiments, the memory footprint reduction enables more graphical data to be cached in a non-virtualized environment. In yet other embodiments, storing compressed graphical data enables the CPU 112 to run a game application that would otherwise not be supported by the system due to the video memory 115 not having enough memory space (i.e., memory units available).

The GPU memory usage reduction system 100 disclosed herein may be complemented by the teachings disclosed in commonly owned U.S. patent application Ser. No. 13/273, 555, entitled Streaming Bitrate Control and Management. Accordingly, U.S. patent application Ser. No. 13/273,555 is incorporated by reference in its entirety.

Figure 2:
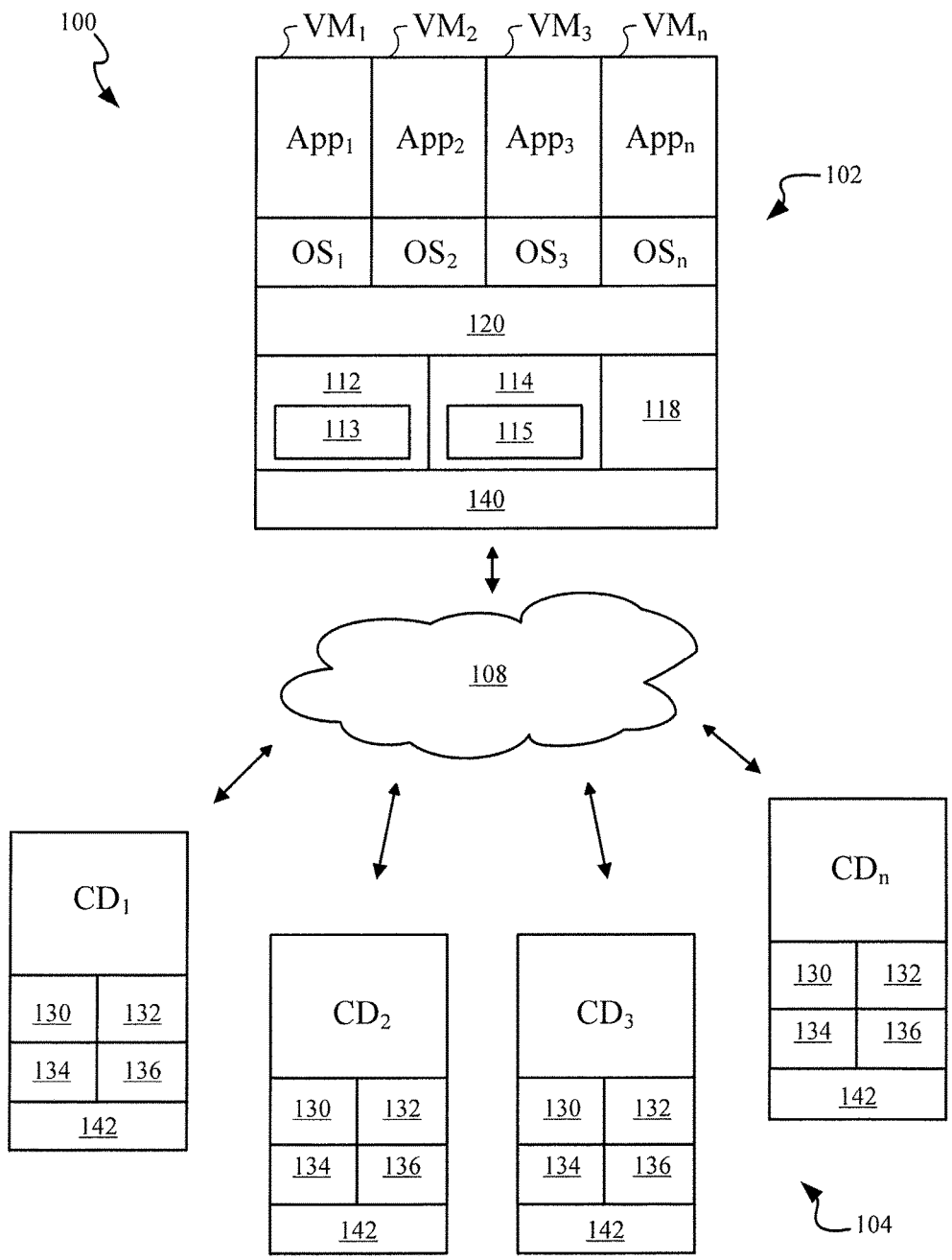
FIG. 2 displays a block diagram illustrating another embodiment of a memory usage reduction system in a virtualized environment.

Referring now to FIG. 2, another embodiment of GPU memory usage reduction system 100 in a virtualized environment is shown. In this embodiment, GPU memory usage reduction system 100 includes the components as set forth in the embodiment shown in FIG. 1 as well as a compression module 140 to control the consumption of bandwidth over the communication network 108 as disclosed in commonly owned U.S. patent application Ser. No. 13/273,555, entitled Streaming Bitrate Control and Management. In such an embodiment, the client devices 104 may include a decompression module 142 to decompress (i.e., decode) the encoded data sent over the communication network 108 from the server 102.

Figure 3:
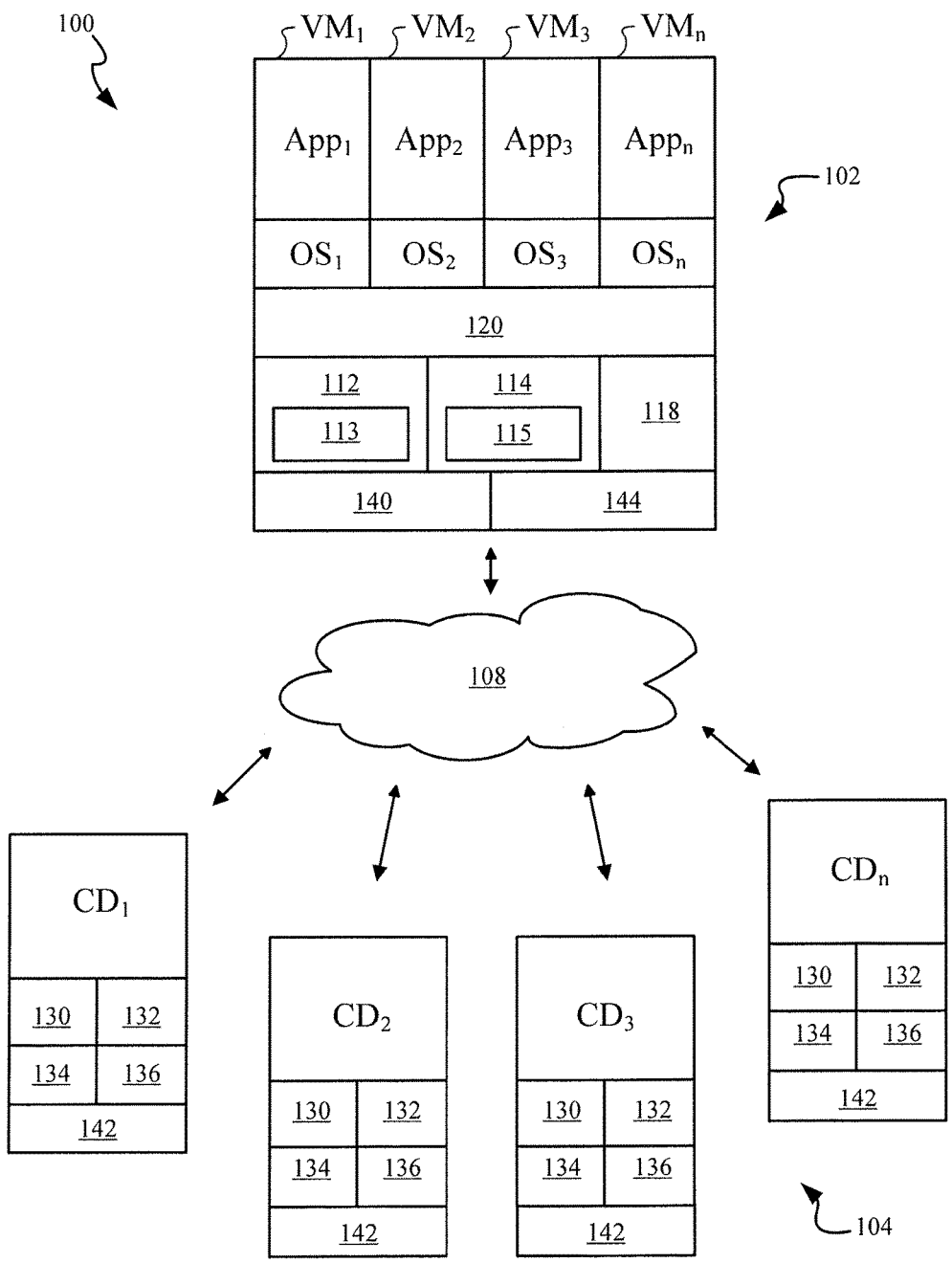
FIG. 3 displays a block diagram illustrating yet another embodiment of a memory usage reduction system in a virtualized environment.

Referring now to FIG. 3, another embodiment of GPU memory usage reduction system 100 in a virtualized environment is shown. In this embodiment, GPU memory usage reduction system 100 includes the components as set forth in the embodiments shown in FIGS. 1 and 2 as well as an instruction management module 144 as disclosed in commonly owned U.S. patent application Ser. No. 13/273,555, entitled Streaming Bitrate Control and Management.

Figure 4:
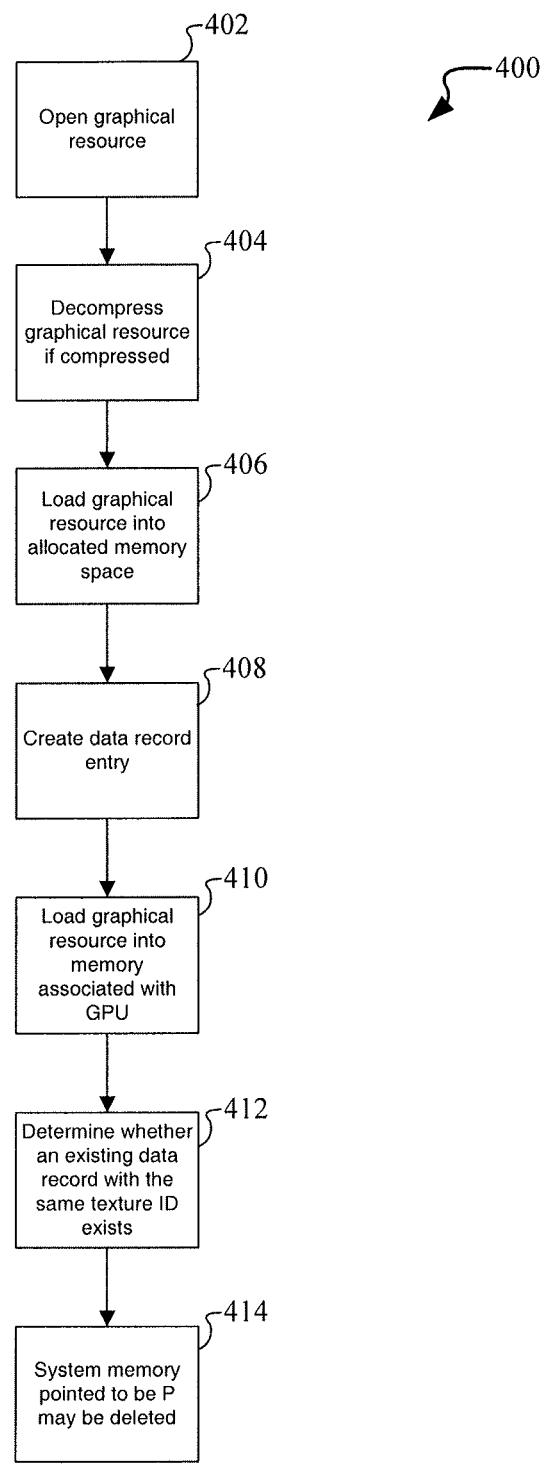
FIG. 4 displays a logic flow diagram depicting a data collection process.

Referring now to FIG. 4, the GPU memory usage reduction system 100 employs a data collection process 400. The data collection process 400 creates a data record of graphical resources that are associated with static and dynamic textures by intercepting texture loads. Otherwise stated, the data collection process 400 determines which graphical resources are static and which are dynamic and makes a record of such a determination. This may affect which textures are loaded into the video memory 115 during the pre-load boot process in a compressed or uncompressed state. In some embodiments, all pre-loaded textures are compressed before storage in video memory 115. In other embodiments, only static textures are compressed before storage in video memory 115. In these embodiments, there may be textures that are not pre-loaded into video memory 115, which may be, instead, stored in the system memory 113 in the uncompressed state and loaded into video memory 115 when needed. In other embodiments, static textures may be categorized into two or more groups. For example, one group may consist of static textures that are compressed during the pre-load process and stored whereas a second group may consist of static textures that are not compressed before storage in video memory 115. Such grouping may be based on one or more different criteria, such as file name, frame number, frame size, and the like.

The data collection process 400 may be virtualized on one or more virtual machines, such as those shown in FIGS. 1-3. In some embodiments, the data collection process 400 may not entail modification at the application level. Instead, the process may entail modification at the operating system level. In some embodiments, modification at the operating system level may remove jurisdictional requirements (e.g., where the client device is an electronic gaming machine in a gambling establishment). Modification at the operating system level may also remove the need to modify each application in the virtualized environment. In other embodiments, the data collection process 400 may entail modification at the application level. In such embodiments, jurisdictional requirements may or may not be a concern. For example, a game involving skill, such as a first person shooter, may either implement the data collection process at the application level or the operating system level.

In the embodiment shown in FIG. 4, the data collection process 400 may be implemented at the operating system level for a game application (e.g., a slot machine style game). The application, which in this embodiment is a game application, includes a resource list that contains a list of all the graphical resources associated with it (e.g., static textures and dynamic textures). In one embodiment, the data collection process may be run for a game application during initial deployment or while it is in the field (e.g., casino gaming environment). In another embodiment, the data collection process may be run while the game application (or client device that presents the game application) is out-of-service. In another embodiment, the process may be run while the game application is being tested or otherwise not in the field.

In one such embodiment, the game application may be run in a debug or showroom mode where each feature of the game can be operated by an operator, such as a test engineer. This ensures that every graphic is loaded and displayed before the data collection process is complete. In yet another embodiment, a test script may be implemented to control the game application to ensure that each possible image and animation is shown ensuring the data collection process encompasses the desired amount of graphical content. In some embodiments, it may be desired to build a data record of all graphical resources. However, it may be desired in other embodiments to build a data record of less than all of the graphical resources. This may occur, for example, where one is interested in only storing the most often used graphical resources in the video memory to further reduce the memory footprint. Accordingly, in some embodiments, the data collection process keeps track of the number of times a graphical resource is called for display. As such, only graphical resources that meet a pre-defined threshold (i.e., called a certain number of times) may be compressed prior to storage in video memory 115, according to some embodiments.

Referring now to the particulars of the data collection process 400, as each graphical resource is opened at block 402, the following occurs: (1) a frame counter variable representing the number of frames is set to zero; (2) the header of the graphical resource is read to determine the amount of memory necessary to decompress and/or store the graphical resource in system memory 113; (3) the requisite memory is allocated in system memory 113, which is pointed to by a pointer P; and (4) a texture identifier is generated by using, for example, an API such as OpenGL. Of course, other embodiments may generate a texture identifier without using the convenience of an API. Generating a texture identifier creates a reference to the texture that may be used for later rendering commands.

At block 404, the graphical resource is decompressed from either a lossy or lossless compressed state from the system memory 113. At block 406, the decompressed graphical resource is loaded into the allocated memory space pointed to by pointer P in system memory 113 (or a memory separate from the system memory 113). In embodiments where the graphical resource is not stored in the system memory 113 in a compressed state, the graphical resource may be loaded into the allocated memory space pointed to by pointer P. At block 408, the data collection process creates a data record for the graphical resource in the form of, for example, a table. In some embodiments, the data record includes a copy of the memory handle corresponding to pointer P, a copy of the file name corresponding to the graphical resource, a copy of the texture ID, the current frame count (via the frame counter variable), a flag indicating whether the graphical resource is static or dynamic, and the like. Depending on the embodiment, the flag may be set to a default value. This default value may indicate whether the graphical resource is static or dynamic.

At block 410, the uncompressed graphical resource stored in system memory 113 pointed to by pointer P is loaded into video memory 115. This task may be performed by the graphics driver with, for example, OpenGL providing a standard interface. Thus, for example, the "glTexImage2D" command may be used to achieve this task in some embodiments. The graphical resource load process may be intercepted, for example, at block 412 to determine whether an existing data record with the same texture identifier exists. In embodiments utilizing OpenGL, this may entail intercepting the "glTexImage2D" function.

A match indicates that the graphical resource is dynamic. As such, the flag is set to the appropriate value (or left as is if the default value is the appropriate value) to indicate whether the graphical resource is static or dynamic in the data record. This static/dynamic flag enables quick identification between static and dynamic graphical resources.

If no matching record is found with respect to the texture identifier, the data collection process determines whether a data record with a matching pointer P value exists. If a match occurs, the data collection process copies the texture identifier into the data record for the current graphical resource. More specifically, the match is the P value copied to the data record at block 408. Copying the texture identifier into the data record for the current graphical resource associates the current texture identifier with the file name corresponding to the graphical resource. Pointer P is used to make this association even though it is temporary because it is common to both the decompression function and the texture load. Such an association enables identification of the files that are static textures and those that are dynamic. In some embodiments, the data collection process identified in FIG. 4 associates file names and texture identifiers with each frame corresponding to a graphical resource. As such, each frame may be individually marked as static or dynamic.

Following block 412, the system memory 113 pointed to by P may be deleted at block 414 because it is no longer needed for the data collection process. When the data collection process is deemed complete, for example, where a test script or test run has finished, the contents of the data record generated by the data collection process may be saved or transmitted for analysis for further processing. Each entry in the data record corresponds to a graphical resource and has a static/dynamic flag indicating whether the resource is static or dynamic.

In some embodiments, only static textures are good candidates for texture compression. However, dynamic textures may be good candidates for texture compression in other embodiments. Some embodiments may even consider the frame count, file name, pointer P value, texture identifier, or combinations thereof to determine whether a graphical resource is to be texture compressed. For example, every odd, even, second, third, fourth, or tenth frame in an animation may be texture compressed, as opposed to compressing each frame.

For static textures derived from images, the frame counter variable is always zero because an image is a single frame. For static textures derived from animations, each frame of the animation may be decompressed into the system memory 113 in turn. The frame counter variable is incremented accordingly. An individual texture ID is generated for each frame of the animation. Each frame of the animation is also loaded into the video memory 115. As such, the data record for a non-streamed animation may include an entry in the data record for each frame such that each frame is individually marked as being static or dynamic.

For dynamic textures (i.e., streamed animations), the process results in the static/dynamic flag being set to a value designated to indicate that it is dynamic where the second frame of the streamed animation is loaded into the video memory 115. This occurs because an existing data record with the same texture identifier was found to exist at block 412. This may occur in an embodiment, for example, utilizing OpenGL where the "glTexImage2D" command is re-using the previous texture identifier. Thus, calling the same file more than once may result in a different pointer P value but the same texture identifier. Such a scenario results in flagging the current frame as a dynamic texture. Depending on the embodiment, the data collection process may set the static/dynamic flag of the first frame corresponding to a streamed animation to dynamic once the process determines that the frames following it have been marked as such. In other embodiments, the first frame of a streamed animation may be left as being marked as a static texture without alteration.

In some embodiments, one or more blocks in data collection process 400 may be executed in parallel where applicable. In other embodiments, one or more blocks may be executed in a serial fashion where applicable. In yet other embodiments, data collection process 400 may execute one or more blocks in serial and one or more blocks in parallel where applicable.

In another aspect of one embodiment, the data collection process 400 intercepts/modifies three function calls at block 402 (open resource as a file), block 404 (decompress graphical resource), and block 410 (loading of the decompressed graphical resource into the video memory 115).

Figure 5:
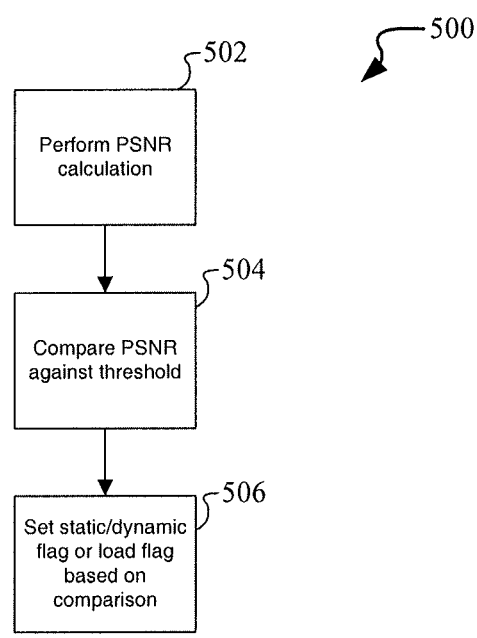
FIG. 5 displays a logic flow diagram depicting a compression quality process.

Referring now to FIG. 5, the GPU memory usage reduction system 100 may employ a compression quality process 500 for each texture identified as being static. At block 500, each image (single frame) or each animation (multiple frames) that is designated as being a static texture is compressed according to a compression algorithm, for example, the BC7 algorithm. In some embodiments, each texture is compressed according to multiple compression algorithms, such as BC1, BC7, and the like.

At block 502, a peak-signal-to-noise ratio (PSNR) calculation is performed on the original frame and the texture compressed version of the same frame. At block 504, the resultant PSNR is compared against a threshold value. At block 506, the static/dynamic flag may be altered or set based on the comparison. For example, if the process determines that the PSNR meets a certain threshold (e.g., 30 dB or lower in some embodiments), the static/dynamic flag may be marked as dynamic. In other embodiments, the static/dynamic flag may not be altered, and instead, a load flag is used. The load flag may be used to keep track of which static and dynamic textures are to be loaded into video memory 115 in a compressed state. This additional flag enables one to maintain the first determination of whether the graphical resource is static or dynamic but also keeps a record of which graphical resources are being loaded into the video memory 115.

In one embodiment of the memory usage reduction system 100, the threshold may be of a value greater than or less than 30 dB. In some embodiments, different PSNR thresholds may be used for images and animations because compression artifacts may be less visible in animations when compared to images, or vice versa, depending on the length of time the frame is displayed. As such, the PSNR threshold for frames corresponding to animations may be lower than the PSNR threshold for images, or vice versa. In embodiments where each texture is compressed according to multiple compression algorithms, the PSNR calculation is performed on each frame corresponding to each compression algorithm to determine the optimal compression algorithm to use for that particular texture. Thus, a higher compression ratio may be deemed, in some embodiments, optimal over a lower compression ratio where the texture is part of a fast moving animation because the compression artifacts may be less visible.

As a result of each graphical resource being individually tested at block 502, it is possible for an animation to include frames designated as dynamic and others designated as static (when only the static/dynamic flag is used). In embodiments where a load flag is used, the value of the static/dynamic flag may be left to maintain the determinations made during the data collection process 400. Thus, even though each frame in a given animation may be marked as being static, the load flag may be used to indicate whether one or more of these frames are to be compressed before loading into the video memory 115 or even loaded into the video memory at all. For example, the load flag could be 2 bits in length and indicate one of the following: (1) ignore the load flag, (2) load the frame into video memory in a compressed state, (3) load the frame into video memory in an uncompressed state, or (4) do not load the frame into video memory at all and treat it as a dynamic texture (which are not generally pre-loaded into the video memory).

Of course, the load flag may have a default value just as the static/dynamic flag may have one. Additionally, the data collection process may also implement the load flag. For example, every time a frame is determined to be a static texture, the static/dynamic flag is set to indicate this, and the load flag is also set to indicate the default load treatment (e.g., frame is compressed before loading it into the video memory 115).

After the data collection process 400, and the compression quality process 500 if implemented, the data record provides a definitive list that identifies graphical resources as being static or dynamic. Using the data record, static textures (or textures marked as static even though they are dynamic or textures marked with a load flag indicating compression thereof) may be automatically compressed during normal boot-up operation or prior to normal game operation. Thus, rather than only store uncompressed textures in the video memory 115, compressed textures are also stored. Doing so reduces the memory footprint at no discernible cost to game display performance because it is done during the boot process (or prior to normal game operation). During game operation, the compressed textures may be decompressed in real-time by the GPU.

Figure 6:
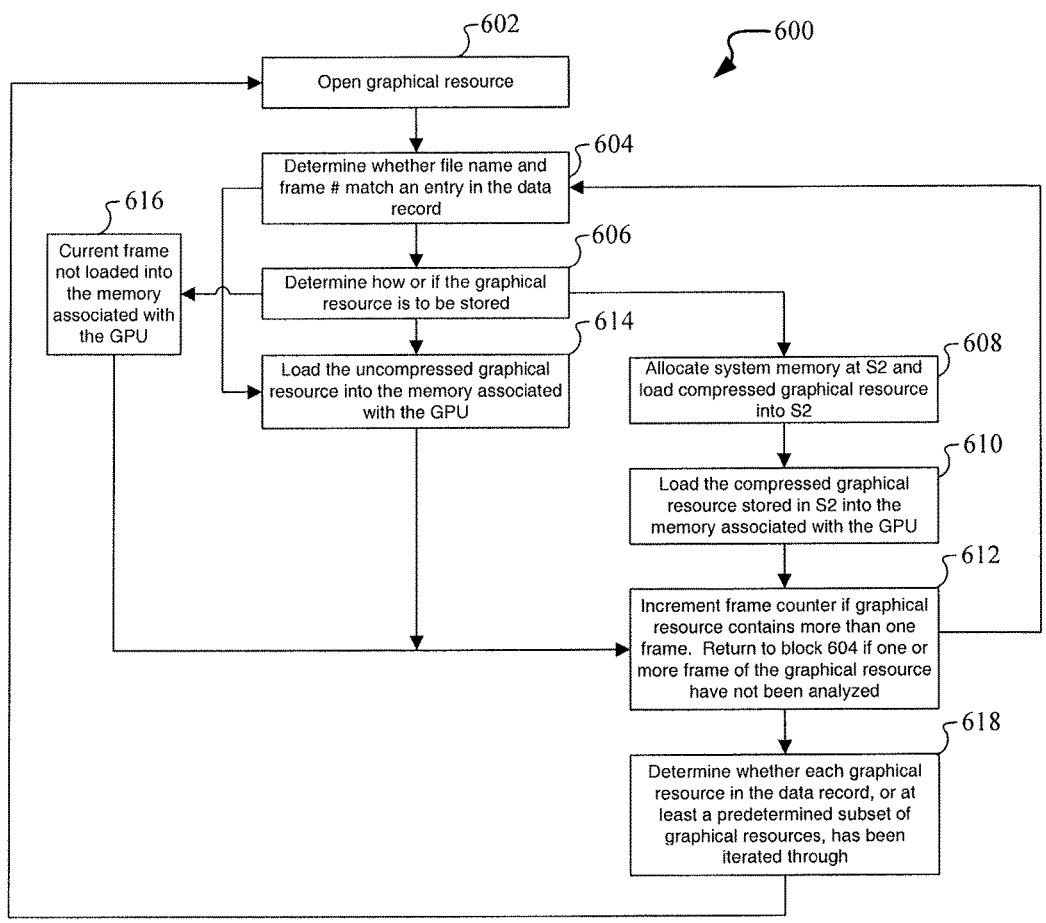
FIG. 6 displays a logic flow diagram depicting a graphical resource load process.

Referring now to FIG. 6, the GPU memory usage reduction system 100 may employ a graphical resource (texture) load process 600 in accordance with the data record built from the data collection process 400 and the quality process 500, if implemented. Similar to block 402, as each graphical resource is opened at block 602 for loading the graphical resource into video memory 115, the following occurs: (1) a frame counter variable representing the number of frames is set to zero; (2) the header of the graphical resource is read to determine the amount of memory necessary to decompress and/or store the graphical resource in system memory 113; (3) the requisite memory is allocated in system memory 113 at S1; and (4) a texture identifier is generated by using, for example, an API such as OpenGL. Of course, other embodiments may generate a texture identifier without using the convenience of an API.

Following block 602 (opening of graphical resource), the data record associated with the data collection process 400 is referenced at block 604 to determine whether the file name and frame number corresponding to the current graphical resource match an entry in the data record. If such a match does not exist, the process proceeds to block 614. However, if a match is found, block 604 proceeds to block 606 to determine whether the graphical resource is to be stored in the video memory 115 in a compressed state, uncompressed state, or even stored in the video memory at all.

The determination at block 606 may be based on the static/dynamic flag value and/or the load flag value stored in the data record corresponding to the current graphical resource. For example, in some embodiments, if the static/dynamic flag value indicates that the current graphical resource is dynamic, the process may proceed to block 616 from block 606. At block 616, the current frame is not loaded into the video memory 115 and the process proceeds to block 612 (increment frame counter and return to block 604 if applicable). If the static/dynamic flag value indicates that the current graphical resource is static, the process may proceed to block 608.

In other embodiments, if the load flag value indicates that the current graphical resource (whether static or dynamic) is to be loaded into the video memory 115 in the uncompressed state, the process may proceed to block 614 (load uncompressed graphical resource into the video memory) from block 606. However, if the load flag value indicates that the current graphical resource (whether static or dynamic) is to be loaded into the video memory 115 in the compressed state, the process may proceed to block 608 (allocate system memory at S2 and load compressed graphical resource into S2). Further yet, if the load flag value indicates that the current graphical resource (whether static or dynamic) is not to be loaded into the video memory 115, the process may proceed to block 616 (frame not loaded into video memory).

In yet other embodiments, the process may only continue on from block 606 if both the static/dynamic flag and load flag are each of a certain value.

At block 608, a second memory allocation is made at S2 in system memory 113. In some embodiments, S2 is the same location in memory as S1. However, in other embodiments, S2 is different than S1. A compressed version of the graphical resource may be loaded into the memory location S2 at this time. In some embodiments, this entails reading a previously stored, compressed version of the graphical resource into memory location S2. This previously stored, compressed graphical resource may be stored on the system memory 113. In these embodiments, the process proceeds to block 610 after S2 is loaded with the compressed version of the graphical resource.

In other embodiments, the graphical resource may be compressed at this time by, for example, the GPU or an encoder distinct from the GPU. Accordingly, the graphical resource may be decompressed from either a lossy or lossless compressed state in the system memory 113 and loaded into memory location S1. If the graphical resource was not compressed, it may be read directly into memory location S1 or read from its stored location and not even read into S1. The uncompressed graphical resource may then be encoded pursuant to a compression algorithm, and stored in memory location S2. Following storage of the compressed graphical resource in memory location S2, the process continues to block 610.

At block 610, the compressed graphical resource stored in memory location S2 at block 608 is loaded into the video memory 115. Block 610 then proceeds to block 612.

At block 612, the process increments the frame counter variable for graphical resources consisting of more than one frame (animations), and returns to block 604. Returning to block 604 for each frame in an animation ensures that each frame is analyzed within each graphical resource. Otherwise, the process proceeds to block 618.

In some embodiments, the frame counter variable is incremented by 1 at block 610. In other embodiments, the frame counter variable is incremented by a value different than 1, such as 2, 4, 8, and the like. In such embodiments, increments above 1 reduce the memory footprint because fewer frames are being loaded into the video memory 115. This may be desired, for example, where an animation consists of what may be perceived as a slow-motion movie because of the subtle changes in the image between each frame. By only loading every second frame or every fourth frame into the video memory 115, and only using these frames when called for rendering, the animation speed can effectively be changed to what may be perceived as normal movement or faster than normal movement.

At block 618, the process determines whether each graphical resource in the data record, or at least a predetermined subset of graphical resources, has been iterated through. If the graphical resource has not been iterated through, the process returns to block 602. If the graphical resource has been iterated through, the process may end to enable normal operation of the corresponding application.

Now with respect to block 614, which follows blocks 604 (determination of whether the file name and frame number corresponding to the current graphical resource march an entry in the data record) or 606 (determination of flag(s) value(s)), the graphical resource may be decompressed from either a lossy or lossless compressed state in the system memory 113 and loaded into memory location S1. The uncompressed frame may then be loaded into the video memory 115. Block 614 then proceeds to block 612.

In some embodiments, one or more blocks in load process 600 may be executed in parallel where applicable. In other embodiments, one or more blocks may be executed in a serial fashion where applicable. In yet other embodiments, load process 600 may execute one or more blocks in serial and one or more blocks in parallel where applicable.

Multiple Virtual Machines Memory Footprint Reduction:

Referring now to FIGS. 7-12, in one embodiment of a multiple virtual machine memory reduction system 700, gaming software is being run in a virtual machine environment. In this streaming gaming solution, multiple instances of gaming software co-exist on a server. Each instance generates a compressed video stream that is transmitted over a network to a thin client video decoder located within the gaming machine. While monolithic game server software capable of handling multiple clients could be build, it is preferable to have each game run in its own virtual machine. In addition to the benefits in common with conventional IT, (e.g., utilization of resources and ease of deployment), virtual machines offer the possibility of using existing legacy game software. This is particularly important in regulated gaming markets since existing games may need only minor or no re-approval from regulators. VMs also provide an easier game development environment since a game does not need to be developed with respect to a complex server infrastructure.

Figure 7:
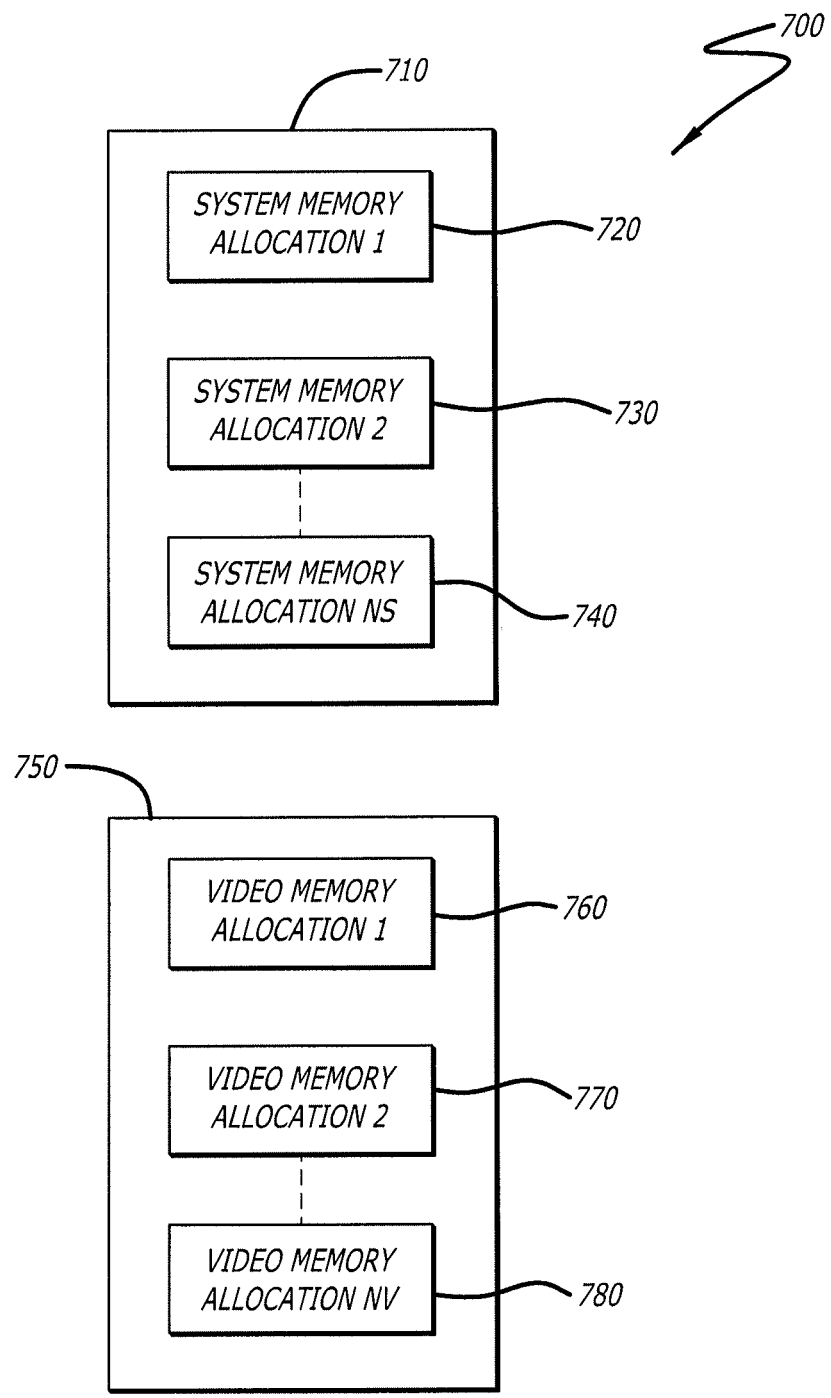
FIG. 7 displays a monolithic game memory software allocation.

Referring now to FIG. 7, a simplified example of memory arrangement in a single game is shown. There are two distinct "heaps" of memory. The first is system memory 710, which is memory associated and primarily accessible by the CPU. The second is video memory 750, which is memory associated and primarily accessible by the video processor (GPU). A heap is memory that is set aside for dynamic allocation. Unlike a stack memory, there is no enforced pattern to the allocation and de-allocation of blocks from a heap. One may allocate a block at any time and free it at any time.

The disclosed embodiments are primarily concerned with optimizing the amount of system/video memory used utilized by multimedia resources (e.g., images, animations and audio). These types of data are by far the largest consumer of both system and video memory. As has been discussed above, images and animation are loaded into video memory for the purpose of repeated fast access by the GPU. Similarly, other multimedia assets such as video and audio files are cached into system memory to lessen access to secondary storage such as hard-drives which may have a shortened lifespan if over-used.

In a conventional game/OS combination both the system and video memory heaps are allocated as needed. No automatic handling of duplicate resources is necessary because it is presumed the game software has been written correctly to only load or cache into memory resources that are actually required. As shown in FIG. 7, excluding non-multimedia memory, once a game has run through a number of cycles it may be seen that there are a fixed number (denoted by NS in FIG. 7) of system memory allocations 720, 730, 740 and a fixed number (denoted by NV in FIG. 7) of video memory allocations 760, 770, 780. Each of these allocations determines the total memory footprint of the game.

Figure 8:
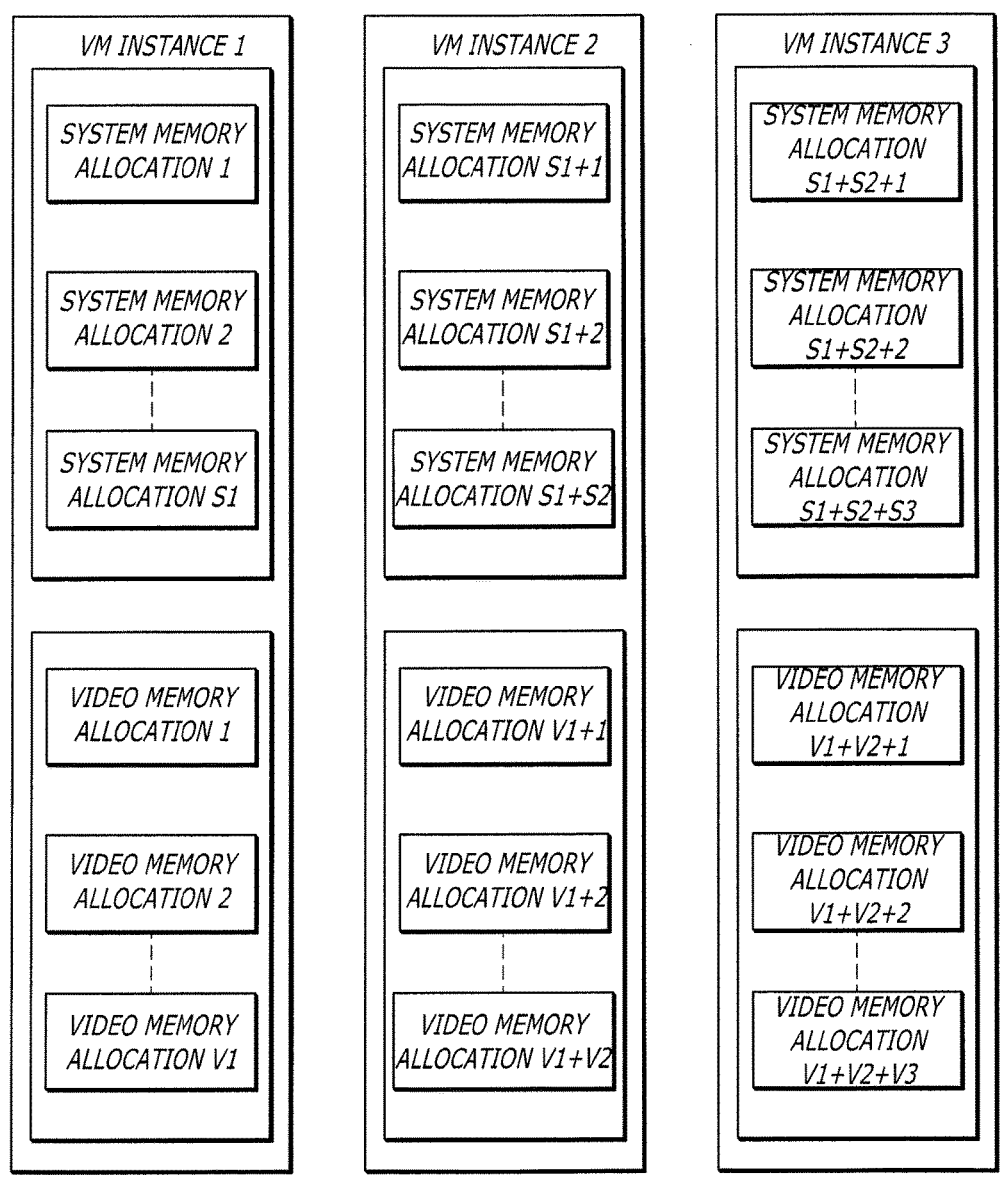
FIG. 8 displays a conventional co-existence memory allocation.

Referring now to FIG. 8, a simplified view is shown of the consequences of multiple VM hosted games being loaded into a combined system memory heap and combined video memory heap. In this embodiment, it may be seen that no sharing of resources occurs. Each game adds to the overall footprint as it is loaded. If three identical games are loaded, then the memory allocation required is three times as much as if one game was loaded.

Figures 9, 10:
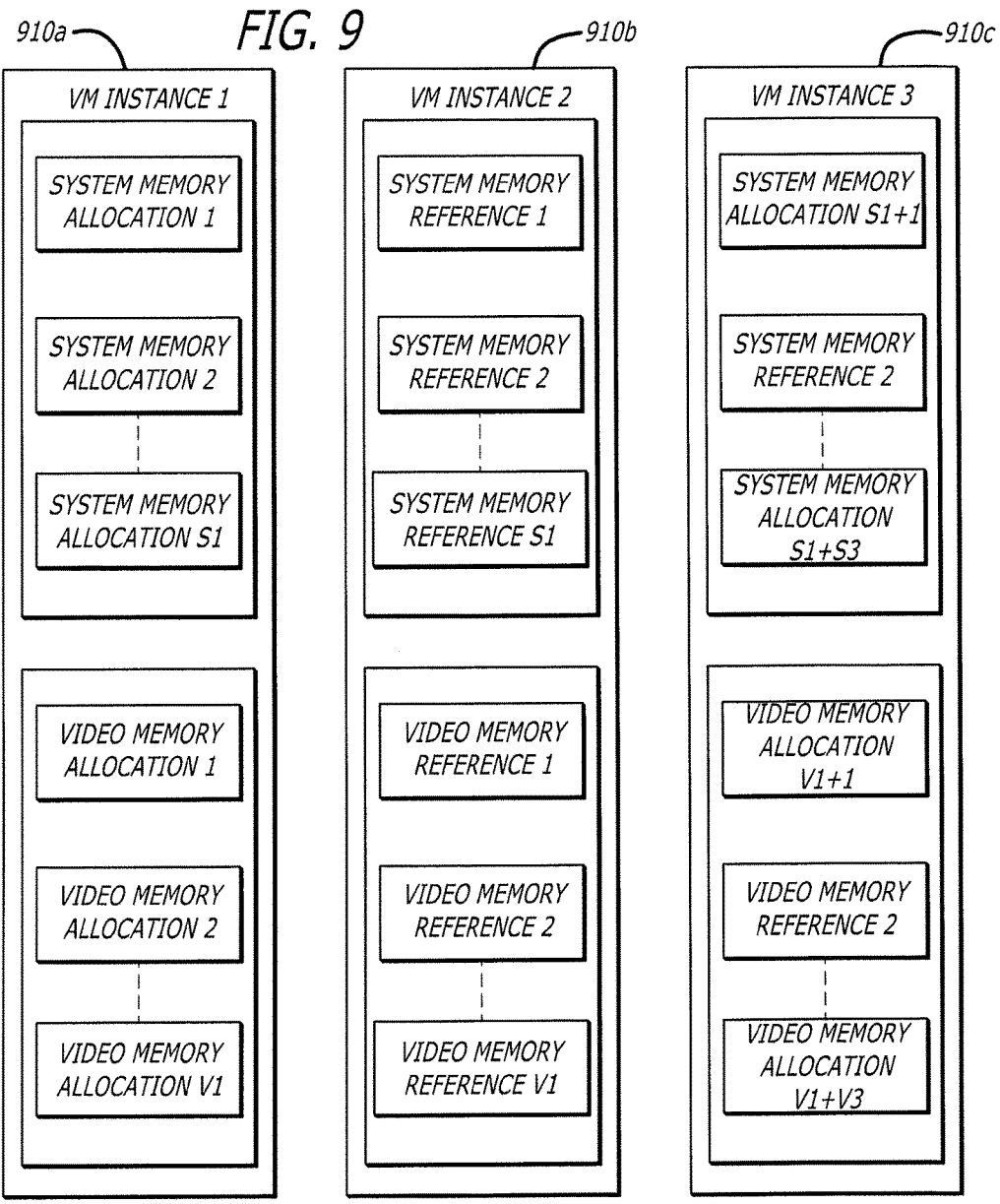
FIG. 9 displays a co-existence with shared resources.
FIG. 10 displays an example manifest of game assets.

FIG. 9, in contrast, shows an idealized view of the possibilities afforded by the multiple virtual machine memory reduction system 900. In this embodiment, both VM instance 1 (910a) and VM instance 2 (190b) are instances of the same game. As such, instance 2 (190b) does not require any additional system or video memory footprint for cached or loaded resources. VM instance 3 (190c) is a different game, but shares some resources with the VM instance 1 game; (e.g., some fonts or symbols are common). In this case, the additional footprint is smaller than if the multiple virtual machine memory reduction system 900 was not implemented.

The multiple virtual machine memory reduction system 900 achieves this optimization of memory footprints by using a manifest file 990 associated with each game. This manifest file is already generated for existing gaming machine software (e.g., an excerpt is shown in FIG. 10) for the purposes of security. Traditionally, as a file is loaded into memory, its contents are cryptographically hashed with the SHA1 algorithm, and this hash is used as an input to a digital signature algorithm, typically the US DSA standard (FIPS 186). If the signature is valid, then the file has not been tampered with and execution may continue.

In this embodiment, this manifest may also be used as a way of uniquely identifying each multimedia asset used by a game. Since a DSA signature (or even an SHA1 hash) is exceedingly unlikely to match two different assets (the odds of this collision happening by chance are astronomical) it may be seen that even identically named assets may be distinguished by the signature or hash stored in the manifest.

Manifests of different games, therefore, may be compared to identify resources that are common by examining the signatures of each entry in the manifest in conjunction with the file type. In practice, the preferred implementation is for a host system to keep a combined manifest of all resources currently loaded across multiple VMs. As each game is loaded into its VM, the process in FIG. 11 may be followed.

Figure 11:
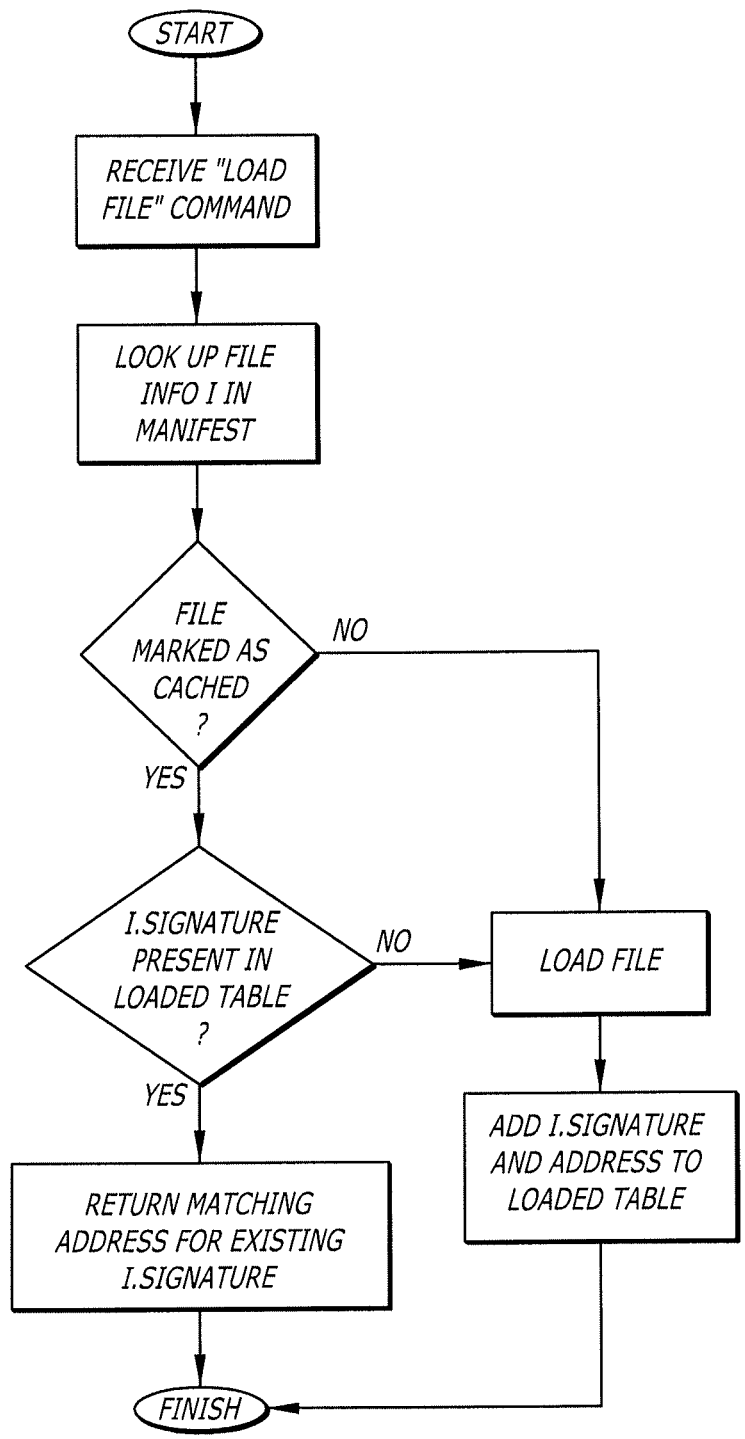
FIG. 11 displays a logic flow diagram depicting a modified loading process to share resources.

The process of FIG. 11 is expected to be implemented mainly during the initial start-up of the game VM. The host operating system intercepts commands to load or cache files into memory. As each file is opened, it is compared against the manifest. If it is marked as cacheable, the signature of the file is used as a key for a table (e.g., named LOADED) of resources already cached in memory. If the signature is present in the table, then instead of re-loading the resource, the address/pointer/handle to the existing resource is used. If not, then the file is loaded as normal, with the signature and address/pointer/handle of the resulting allocation stored in the LOADED table.

A few points are noteworthy about this process. First, the process exists outside of the Virtual Machines. It is a process that runs on the host operating system. Second, the decision as to whether items in a manifest are marked as shared resources may be made dependent upon file type. So for "Bink" animation files, which are generally loaded and streamed from system memory, a mark would be made to share these resources. For "PNG" files, which are loaded into video memory as textures, an adapted process may be used. This process is shown in FIG. 12.

Figure 12:
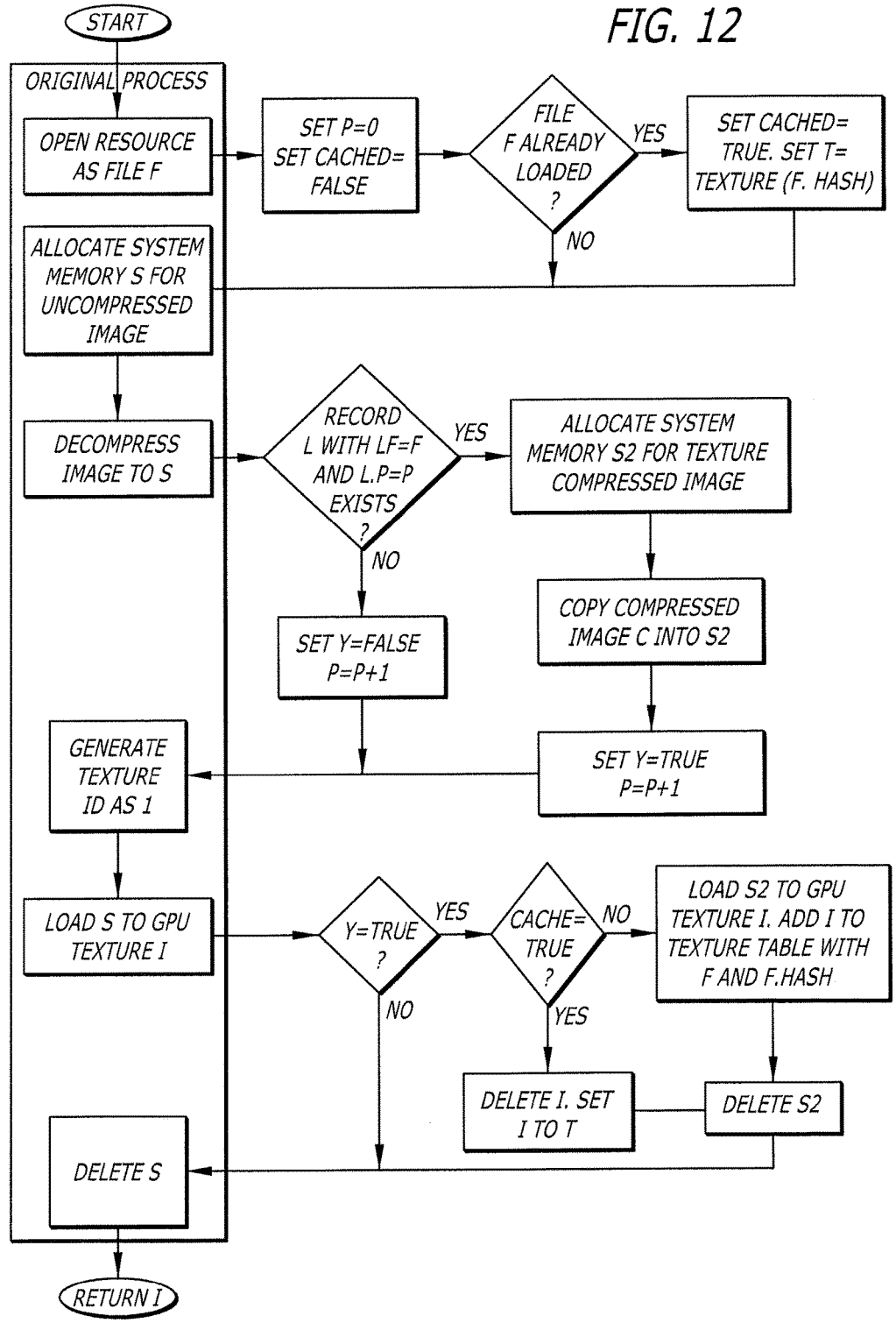
FIG. 12 displays a logic flow diagram depicting a modified texture load process with cache awareness.

The process displayed in FIG. 12 is configured to share textures in video memory across games that co-exist on a host system in virtual machines, thereby extending the concept of compressing textures. As each file is opened, it is checked to see if a texture matching the same signature (or hash) has already been loaded into video memory. If so, flags are set so that when the texture load operation is attempted, instead of a new texture being created the existing texture is used instead.

By performing these processes, the total amount of video and system memory required to host games either sharing all or some multimedia assets may be greatly reduced. Such reductions may make the installation of many more games on one server possible. This design improves memory performance when identical games or any games sharing multimedia resources are commonly loaded onto a game server. This results in more games being loaded onto each server, and thus each server becomes more cost efficient. There are also potential increases in speed from loading multiple instances of games since shared resources do not need to be decompressed or otherwise moved into video memory more than once.

In one implementation of the multiple virtual machine memory reduction system, the Xen hypervisor is used for virtualization, Linux for the host operating system, Linux for the guest operating system for each game, and OpenGL for the shared graphics library. Further, in one such implementation, DSA signatures are used from existing Alpha 2 manifest files; however, these could also easily replaced with SHA1 hashes as used by a GSA GATT tool with no loss of functionality.

Additionally, the multiple virtual machine memory reduction system includes notable structural and/or operational features, including: (1) virtual machines that share multimedia assets; (2) the use of existing manifest files currently produced for authentication purposes to determine shared assets; (3) the ability to load in multiple existing games with a smaller footprint without re-approval by jurisdictional authorities.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers), as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

When logic is implemented as software and stored in memory, one skilled in the art will appreciate that logic or information, can be stored on any computer-readable medium for use by or in connection with any computer and/or processor-related system or method. In the context of this document, a memory is a computer-readable medium that is an electronic, magnetic, optical, or another physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any means that can store, communicate, propagate, or transport the program associated with logic and/or information for use by or in connection with the instruction execution system, apparatus, and/or device. The computer-readable medium can be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette (magnetic, compact flash card, secure digital, or the like), a random access memory (RAM), a read-only memory (ROM), an erasable programmable read-only memory (EPROM, EEPROM, or Flash memory), an optical fiber, and a portable compact disc read-only memory (CDROM). Note that the computer-readable medium, could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

In addition, those skilled in the art will appreciate that certain mechanisms taught herein are capable of being distributed as a program product in a variety of forms, and that an illustrative embodiment applies equally regardless of the particular type of signal-bearing media used to actually carry out the distribution. Examples of signal-bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

Various aspects of the systems, methods, functions, steps, features and the like corresponding thereto disclosed herein may be implemented on one or more computer systems using hardware, software, firmware, circuits, or combinations thereof. Hardware, software, firmware, and circuits respectively refer to any hardware, software, firmware, or circuit component. Computer systems referred to herein may refer to any computing device and vice versa (e.g., smart phone, mobile computing device, personal data assistant, tablet computer, laptop computer, desktop computer, gaming machine, other computing devices, and the like). For example, each computer system or computing device in the systems described herein or any embodiment of a system disclosed herein may utilize one or more of the following components: a single-core or multi-core hardware processor (e.g., central processing unit or graphics processing unit) on which software instructions are executed (e.g., instructions corresponding to an operating system, an application program, an interpreter such as a virtual machine, or a compiler); a memory associated with and in connection with the hardware processor such as cache or other system memory that stores software instructions or other data that the hardware processor may access for processing; an input device (e.g., mouse, keyboard, touchscreen, and the like); an output device (e.g., display, touchscreen, printer, and the like); a network or communication interface that enables the computer system to communicate over a network or communication protocol; an application program having corresponding software instructions that are executable by a hardware processor. Connections between different computer systems and connections between different computer system components may be wired or wireless.

Virtualization computing techniques, cloud computing techniques, web application/website computing techniques, traditional and adaptive streaming techniques, and other computing techniques may be implemented by any embodiment of a system disclosed herein to enable and/or enhance the teachings described herein. For example, in a cloud computing embodiment, one or more servers (i.e., one or more computer systems) may store and execute software instructions corresponding to an application program based on input data received from client devices. In response to the input data received, the application program is executed accordingly, which results in graphical data being processed and output to the client devices for display on a display such as a touch screen on a smart phone or tablet computer.

As another example, in a web application or website embodiment, data representative of a user input may be transmitted to a server (i.e., a computer system) hosting the website for processing and storage in memory. In an application program embodiment, the application may be stored and executed locally on a user's computer system. In other embodiments, one or more components of the application program may be stored and executed on a server and the user's computer system. For example, a user may download the application program from an app store for an Android computing device, Blackberry computing device, Apple computing device, Windows computing device, Samsung computing device, other computing devices, and the like. Execution of the application program on the user's computing device may require that the device transmit and receive data to and from one or more computing devices such as a server or other user's computing device. For example, an application may be downloaded from a server to a mobile device. Upon installation, the mobile device may communicate with a server, such as a gaming server.

One or more embodiments of the systems disclosed herein may utilize streaming technology. Streaming data enables data to be presented to the user of the client device while the client device receives data from the server. Streaming data from servers to client devices (e.g., computing devices operated by users) over a network is typically limited by the bandwidth of the network, or alternatively, the physical layer net bitrate. Traditional streaming protocols, such as RTSP (Real-Time Streaming Protocol), MS-WMSP (Windows Media HTTP Streaming Protocol), and RTMP (Real Time Messaging Protocol) may be implemented, which essentially send data in small packets from the server to the client device in real-time at the encoded bitrate of the data. Adaptive streaming may also be implemented. Adaptive streaming almost exclusively relies on HTTP for the transport protocol. Similar to traditional streaming, data is encoded into discrete packets of a particular size; however, the source data is encoded at multiple bitrates rather than a single bitrate. The data packets corresponding to the same data encoded at different bitrates are then indexed based on the bitrate in memory. This streaming method works by measuring, in real-time, the available bandwidth and computer capacity of the client device, and adjusts which indexed data packet to transfer based on the encoded bitrate.

One or more aspects of the systems disclosed herein may be located on (i.e., processed, stored, executed, or the like;

or include one or more hardware or software components) a single computer system or may be distributed among a plurality of computer systems attached by one or more communication networks (e.g., internet, intranet, a telecommunications network, and the like). One or more components of a computer system may be distributed across one or more computer systems in communication with the computer system over a communication network. For example, in some embodiments, the systems disclosed herein may utilize one or more servers (i.e., one or more computer systems dedicated for a particular purpose in the system) that may be dedicated to serve the needs of one or more other computer systems or components across a communication network and/or system bus. The one or more servers may provide a central processing location for one or more aspects of the systems disclosed herein.

Again, various aspects of the systems, methods, function, and steps corresponding thereto disclosed herein may be implemented on one or more computer systems using hardware, software, firmware, or combinations thereof. Those of ordinary skill in the art will appreciate that one or more circuits and/or software may be used to implement the system and methods described herein. Circuits refer to any circuit, whether integrated or external to a processing unit such as a hardware processor. Software refers to code or instructions executable by a computing device using any hardware component such as a processor to achieve the desired result. This software may be stored locally on a processing unit or stored remotely and accessed over a communication network.

As disclosed herein, a processor or hardware processor may refer to any hardware processor or software processor. A software processor may include or otherwise constitute an interpreter that is executed by a hardware processor. A computer system according to any embodiment disclosed herein is configured to perform any of the described functions related to the various embodiments of the systems disclosed herein.

As disclosed herein, any method, function, step, feature, or result may be considered a module that may include software instructions that cause, when executed by a computing device, the desired method, function, step, feature, or result. Executed by a computing device includes execution by any hardware component (e.g., CPU, GPU, network interface, integrated circuits, other hardware components, and the like) of the computing device such as a hardware processor. Any module may be executed by a computing device (e.g., by a processor of the computing device). Any method, function, step, feature, result, and the like disclosed herein may be implemented by one or more software modules whether explicitly described or not. Individual components within a computing device may work together to accomplish a desired method, function, step, feature, or result. For example, a computing device may receive data and process the data. A simple example would be that a network interface receives the data and transmits the data over a bus to a processor.

Various aspects of the systems disclosed herein may be implemented as software executing in a computer system. The computer system may include a central processing unit (i.e., a hardware processor) connected to one or more memory devices, a graphical processing unit, input devices such as a mouse and keyboard, output devices such as speakers and a display, a network interface to connect to one or more other computer systems (e.g., one or more computer systems configured to provide a service such as functioning as a database), an operating system, a compiler, an interpreter (i.e., a virtual machine), and the like. The memory may be used to store executable programs and data during operation of the computer system. The executable programs may be written in a high-level computer programming language, such as Java or C++. Of course, other programming languages may be used since this disclosure is not limited to a specific programming language or computer system. Further, it is to be appreciated that the systems and methods disclosed herein are not limited to being executed on any particular computer system or group of computer systems.

Some methods, functions, steps, or features have been described as being executed by corresponding software by a processor. It is understood than any methods, functions, steps, features, or anything related to the systems disclosed herein may be implemented by hardware, software (e.g., firmware), or circuits despite certain methods, functions, steps, or features having been described herein with reference to software corresponding thereto that is executable by a processor to achieve the desired method, function, or step. For example, as disclosed herein, touch devices such as a virtual button deck may provide sensory feedback to a player. The virtual button decks may transmit information related to the sensory feedback and a player's interaction with the virtual button deck to one or more processors. The one or more processors may be any electrical hardware unit, such as but not limited to an integrated circuit, a display manager, a central processing unit, a graphics processing unit, or any other processing unit.

It is understood that software instructions may reside on a non-transitory medium such as one or more memories accessible to one or more processors in the systems disclosed herein. For example, where a computing device receives data, it is understood that the computing device processes that data whether processing the data is affirmatively stated or not. Processing the data may include storing the received data, analyzing the received data, and/or processing the data to achieve the desired result, function, method, or step. It is further understood that input data from one computing device or system may be considered output data from another computing device or system, and vice versa. It is yet further understood that any methods, functions, steps, features, results, or anything related to the systems disclosed herein may be represented by data that may be stored on one or more memories, processed by one or more computing devices, received by one or more computing devices, transmitted by one or more computing devices, and the like.

The various embodiments and examples described herein are provided by way of illustration only and should not be construed to limit the claimed invention, nor the scope of the various embodiments and examples. Those skilled in the art will readily recognize various modifications and changes that may be made to the claimed invention without following the example embodiments and applications illustrated and described herein, and without departing from the true spirit and scope of the claimed invention, which is set forth in the following claims. In addition, various embodiments may be combined. Therefore, reference to an embodiment, one embodiment, in some embodiments, in other embodiments, and the like does not preclude one or more methods, functions, steps, features, results, hardware implementations, or software implementations of different embodiments from being combined. Further, reference to an embodiment, one embodiment, in some embodiments, in other embodiments, examples, and the like provides various aspects that may or may not be combined with those of one or more different embodiments and/or examples.

From the foregoing it will be appreciated that, although specific embodiments have been described herein for purposes of illustration, various modifications may be made without deviating from the spirit and scope of the teachings. Accordingly, the claims are not limited by the disclosed embodiments.

What is claimed:

1. A system for streaming content to a plurality of client devices of the type including a video display, the system comprising:
   a host server that includes system hardware comprising a processor, a server memory, and a network interface, the host server further including a plurality of virtual machines each configured to receive commands to load or cache audio-visual (AV) data assets into the server memory for processing and delivery of content to a client device, wherein the audio-visual (AV) data assets comprise files storing static textures and dynamic textures, and wherein a data collection process creates a data record of graphical resources that are associated with static textures and dynamic textures by intercepting texture loads;
   a communication network that enables communication between the virtual machines and the client devices;
   a system memory including a data structure accessible by the host server storing a combined manifest for AV data assets loaded across at least a plurality of virtual machines;
   wherein the host server is configured to intercept a command from a virtual machine to load or cache a data asset, compare the data asset to the manifest, and if the data asset exists in the manifest, enable the virtual machine to access an instance of the data asset stored in the manifest,
   wherein the manifest for the AV data assets loaded across at least a plurality of virtual machines includes a cryptographic signature, and wherein the host server is configured to compare a cryptographic signature for the data asset to the cryptographic signature of the manifest, wherein if a file is marked as cacheable, a signature of the file is used as a key for a table of resources already cached in the server memory, and
   wherein a process of intercepting a command from a virtual machine to load or cache a data asset, comparing the data asset to the manifest, and if the data asset exists in the manifest, enabling the virtual machine to access an instance of the data asset stored in the manifest, is performed on a host operating system outside of the virtual machines.

2. The system of claim 1, wherein the host server configured to enable the virtual machine to load the data asset and store the data asset in the manifest if the data asset does not exist in the manifest.

3. The system of claim 2, wherein the manifest for the AV data assets loaded across at least a plurality of virtual machines includes a cryptographic signature, and wherein the host server is configured to compare the cryptographic signature for the data asset to the cryptographic signatures of the manifest and if the data asset does not exist in the manifest, to enable the virtual machine to load the data asset and store the cryptographic signature for the data asset at the manifest.

4. The system of claim 1, as each file is opened, the file is compared against a manifest, wherein the manifest is used to uniquely identify each multimedia asset used by a game.

5. The system of claim 1, wherein if the signature is present in the table, the address/pointer/handle to the existing resource is used instead of re-loading the resource, wherein if the signature is not present in the table, then the file is loaded as normal, with the signature and address/pointer/handle of the resulting allocation stored in the table.

6. The system of claim 1, wherein file type determines whether files in a manifest are marked as shared resources.

7. The system of claim 1, wherein the system shares textures in video memory across games that co-exist on a host system in virtual machines.

8. The system of claim 1, wherein as each file is opened, the file is checked to see if a texture matching the same signature has already been loaded into video memory.

9. The system of claim 8, wherein if the same signature has already been loaded into video memory, flags are set so that when a texture load operation is attempted, the existing texture is used instead of a new texture being created.

10. A host server for hosting a plurality of virtual machines each configured to process commands to deliver displayable content to a plurality of client devices over a network, the host server comprising:
    a system memory including a data structure storing for at least a plurality of virtual machines content asset data and a content asset data manifest;
    a hardware processor configured to process and deliver content to a client device over a communication network to enable communication between the virtual machines and the client devices;
    the host server configured to intercept from the virtual machines commands to load or cache data assets, to compare the data asset subject to the commands to the data stored in the data structure and where the data asset subject to the commands exists in the data structure to load or cache the data asset from the data structure, wherein the data assets comprise files storing static textures and dynamic textures, and wherein a data collection process creates a data record of graphical resources that are associated with static textures and dynamic textures by intercepting texture loads;
    wherein the manifest for the AV data assets loaded across at least a plurality of virtual machines includes a cryptographic signature, and wherein the host server is configured to compare a cryptographic signature for the data asset to the cryptographic signature of the manifest, wherein if a file is marked as cacheable, a signature of the file is used as a key for a table of resources already cached in the server memory, and
    wherein a process of intercepting a command from a virtual machine to load or cache a data asset, comparing the data asset to the manifest, and if the data asset exists in the manifest, enabling the virtual machine to access an instance of the data asset stored in the manifest, is performed on a host operating system outside of the virtual machines.

11. The host server of claim 10, wherein the data structure storing a cryptographic tag for each stored data asset, the host configured to compare the cryptographic tag for data asset subject to the command and where the tag compares to a tag on the manifest to load or cache the data asset from the system memory.

12. A method for reducing memory used to host a plurality of virtual machines that are each configured to process data, stream content, and receive input from a player for the play a game at a remote client device over a communication network, the method comprising:

configuring a host server to have access to a memory structure storing content data assets for use by all virtual machines and a manifest representing a cryptographic tag for the data asset;

intercepting a command from a virtual machine to load or cache of required data assets, using the host server;

comparing the cryptographic tag for the required data assets to a cryptographic tag in the manifest, using the host server; and enabling a virtual machine to access an instance of the data asset from the memory structure, when the cryptographic tag compares to a tag in the manifest, wherein the data assets comprise files storing static textures and dynamic textures, and wherein a data collection process creates a data record of graphical resources that are associated with static textures and dynamic textures by intercepting texture loads;

wherein the manifest for the AV data assets loaded across at least a plurality of virtual machines includes a cryptographic signature, and wherein the host server is configured to compare a cryptographic signature for the data asset to the cryptographic signature of the manifest, wherein if a file is marked as cacheable, a signature of the file is used as a key for a table of resources already cached in the server memory, and wherein a process of intercepting a command from a virtual machine to load or cache a data asset, comparing the data asset to the manifest, and if the data asset exists in the manifest, enabling the virtual machine to access an instance of the data asset stored in the manifest, is performed on a host operating system outside of the virtual machines.

13. The method of claim 12, further comprising enabling communication between the virtual machines and the client devices using a communication network.

14. The method of claim 12, further comprising storing a combined manifest for AV data assets loaded across at least a plurality of virtual machines using a data structure accessible by the host server.

15. The method of claim 12, wherein the method is performed on a host operating system outside of the virtual machines.

16. The method of claim 12, wherein as each data asset is opened, the data asset is checked to see if a texture matching a same signature has already been loaded into video memory.

17. The method of claim 16, wherein if the same signature has already been loaded into video memory, flags are set so that when a texture load operation is attempted, the existing texture is used instead of a new texture being created.

* * * * *